United States Patent [19]
Terry

[11] Patent Number: 6,050,391
[45] Date of Patent: *Apr. 18, 2000

[54] SELF-CLEANING CONVEYOR SYSTEM AND METHOD FOR HANDLING PRODUCE

[75] Inventor: Mark Terry, Fresno, Calif.

[73] Assignee: Garden Fresh, Inc., Pocatello, Id.

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,308

[22] Filed: Jul. 2, 1997

[51] Int. Cl.[7] .................................................. B65G 45/22
[52] U.S. Cl. ................................ 198/495; 62/303; 62/380
[58] Field of Search .............................. 198/495; 62/303, 62/336, 380

[56] References Cited

U.S. PATENT DOCUMENTS

| | | | |
|---|---|---|---|
| 2,266,309 | 12/1941 | Cohen | 198/495 |
| 2,855,094 | 10/1958 | Zebarth | 198/495 |
| 4,830,175 | 5/1989 | Durst et al. | 198/495 |
| 5,111,929 | 5/1992 | Pierick et al. | 198/495 |
| 5,758,761 | 6/1998 | Selbertinger et al. | 198/495 |
| 5,772,003 | 6/1998 | Hunt | 198/495 |

*Primary Examiner*—Jospeh E. Valenza
*Attorney, Agent, or Firm*—Fenwick & West, LLP

[57] ABSTRACT

A conveyor system and method includes spraying equipment for sanitizing upper side and underside surfaces of a conveyor belt for handling produce. Water and chemical composition sprayed on the belt at prescribed pressures, and the temperature control of all applicable components significantly reduce microbe and contaminant concentrations on surfaces that contact the produce for the shelf life of produce that contacted sanitized surfaces of the conveyor system.

2 Claims, 1 Drawing Sheet

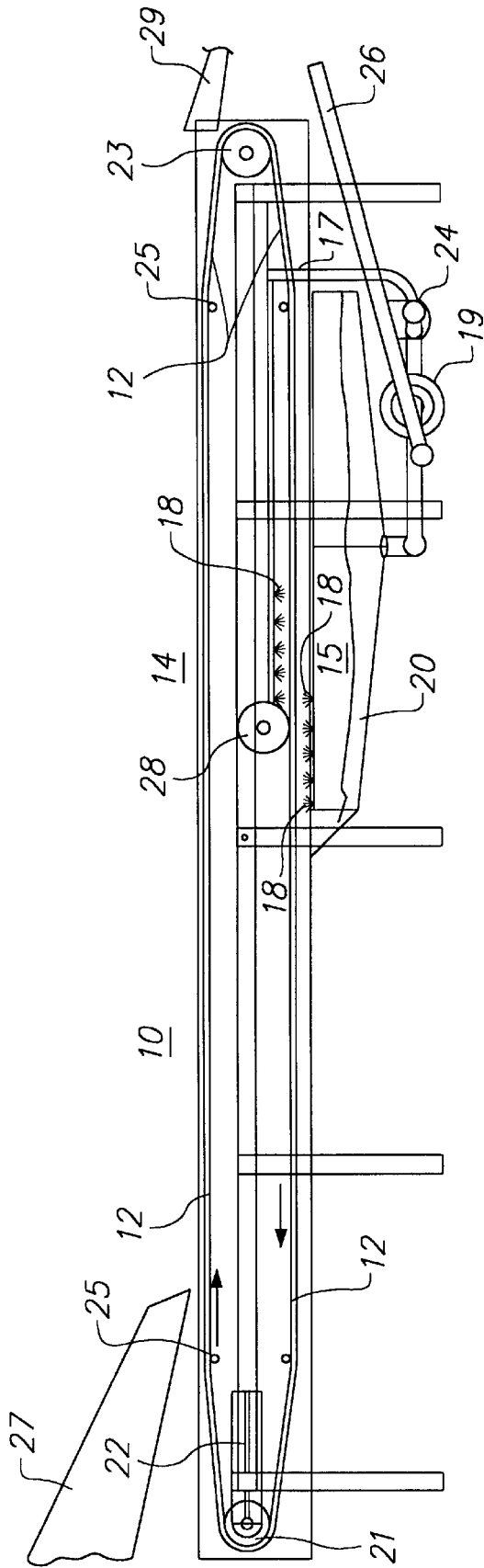

SELF-CLEANING CONVEYOR SYSTEM AND METHOD FOR HANDLING PRODUCE

RELATED APPLICATIONS

The subject matter of this application is related to the subject matter of pending application Ser. No. 08/637,039 entitled "Produce Processing Method and Apparatus," filed on Apr. 24, 1996 by M. Terry, the subject matter of which application is incorporated herein by this reference.

FIELD OF THE INVENTION

This invention relates to apparatus and method for handling fresh produce between harvest and consumer purchase, and more particularly to processing equipment and method for retaining the appeal and extending shelf life of such produce through selected treatments, mechanical manipulations, and handling of mass volumes of such produce.

BACKGROUND OF THE INVENTION

Freshly harvested produce is commonly handled in expedited manner by wholesalers for delivery to retailers in short time intervals from harvest in order to preserve as much shelf life for such produce as possible. The so-called Krebb cycle for fruits and vegetables has been reported to include phases of deterioration from harvest that are affected by such factors as lowering the aspiration rate and reducing the incidents of bruising and bacteriological invasions, since it is believed that the ability of the produce to repair itself from bruises or from invasions of bacteria is materially reduced following removal of the produce from its source of nutrients provided through the vine, stem, stalk or root on which it grew. One known technique for inhibiting or delaying the Krebb cycle and thereby extending available shelf life of produce is to refrigerate the produce to both slow down the aspiration rate and the ripening or deterioration process, and also to minimize the bacteriological invasions throughout the handling and distribution procedures involved up through delivery of the harvested produce to the retailer. Another technique to reduce bacteriological intrusions includes periodic cleaning of the equipment that contacts the produce, typically at the end of a work shift, or less frequently as part of maintenance operations.

SUMMARY OF THE INVENTION

In accordance with one embodiment of the present invention, a conveyor belt is configured to handle newly-harvested produce at various stages of processing and to be sanitized on substantially all surfaces between transport functions on a continuous operational basis. In this manner, bacteriological agents are removed or otherwise neutralized from being available to attack the produce being transported. Additionally, produce processing is performed at reduced temperature, and the associated sanitizing operation also proceeds at reduced temperature.

DESCRIPTION OF THE DRAWING

The drawing is a side view of the illustrated embodiment of a conveyor system according to the present invention.

DETAILED DESCRIPTION OF THE INVENTION

Referring now to the drawing, there is shown a side view of a conveyor system 10 that may be deployed, for example, between cutting and sorting stations, or between a final cool rinse station and a bagging or other final packaging station, or the like. In this illustrated embodiment, the conveyor is configured as a belt 12 that includes a transporting segment 14 along the upper region, and a cleaning segment 15 in the lower region near one end of the conveyor. Of course, the conveyor 10 may be configured to traverse a right-angle corner, or other angular or elevational traversals in conventional manner, or may also be configured as a rotary disk for handling and distributing produce among angularly positioned locations. In such alternate configurations, the conveying medium (i.e., belt or disk) includes a cleaning segment that is segregated from the transporting segment.

The conveyor belt 12 may include a plurality of cross members, or slats, 19 oriented substantially normal to the direction of travel, and disposed in adjacent spaced relationship along the entire length of the belt 12. Alternatively, the entire length of the belt 12 may be formed as a continuous web with corrugated or substantially smooth surface configuration from such material as polyethylene, or other such bioinert material that is sufficiently flexible to withstand numerous passes over end roller 21 and 23. One or more of such end rollers may be powered in conventional manner by a controlled motor 22 to continue movement of the belt 12 in a selected direction at a selected speed, and one or more idler rollers 25 may be disposed beneath the upper surface of the belt 12 to support a traveling load of produce disposed on the transport segment 14 of the upper surface of the belt 12. Alternatively, the transport segment 14 of the belt may be supported by a plurality of fixed, lateral members or a platen over which the belt 12 may slide while transporting produce.

In the illustrated embodiment, the transporting segment of the belt 14 is segregated from the cleaning segment 15 near at least one end and, optionally, near both ends of the conveyor system 10. The cleaning segment 15 is segregated from the transporting segment 14 (as, for example, along upper and lower lengths of the belt 12 in the illustrated embodiment) to facilitate a cleaning procedure that is separate from cleaning or rinsing procedures for produce on the transporting segment 14. In this manner, more severe or aggressive cleaning of the conveyor belt 12 is possible under conditions that would not be acceptable or tolerable by fresh produce. Similarly, cleaning or rinsing processes for produce commonly are not also sufficient or adequate cleaning procedures for the conveyor belt 12

Specifically, the cleaning segment 15 includes a manifold 17 including a plurality of fluid spray nozzles 18 disposed over the entire width of both upper and lower surfaces of the conveyor belt 12 that passes in return direction through the cleaning segment 15 from transporting produce along the transporting segment 14. The manifold 17 is connected to a pump 19 that supplies a liquid composition under pressure to the spray nozzles 18. The liquid composition may include water and dissolved or suspended disinfectant chemicals such as sodium hypochlorite, or TSUNAMI™ 100 (commercially available from ECOLAB of St. Paul, Minn.), or the like, at concentrations of about 5 to 35 parts per million of water. Such liquid composition is supplied to the spray nozzles 18 at volumetric flow rates of about 4 gallons per minute and at a pressure typically of about 20 to about 80 pounds per square inch to cause the liquid composition to impinge severely upon the surfaces of the conveyor belt 12 to promote vigorous action of dislodging and rinsing substantially all surface contaminants such as particulates, microbes, and produce residues from all surfaces of the conveyor belt 12. The conveyor belt 12 may be perforated, or otherwise adequately porous to inhibit pooling of liquid composition on surfaces of the belt 12 (and, optionally, to facilitate produce cleaning and rinsing procedures at one or more locations along the transporting segment 14, without pooling of such cleaning or rinsing compositions in close proximity to the produce). In one embodiment of the invention, a fine-grain filter 24 of about 4-micron porosity may be interposed between the pump 19 and manifold 17 in order to trap and inhibit re-circulation of microbes and particulates above such size. A sump 20 is disposed beneath the spray nozzles 18 and a portion of the returning length of the conveyor belt 12 to catch the run off of liquid composition from the conveyor belt 12 for re-use and re-circulation via the pump 19, filter 24, manifold 17 and spray nozzles 18. An additional roller 28 may be disposed to depress the conveyor belt 12 at a location over the sump 20 in order to promote drainage from the belt 12 at a location over the sump 20. Additional water and disinfectant chemicals may be supplied to the sump 20 via feed line 26 in order to replenish the liquid spray composition and maintain adequate concentration of disinfectant chemical during continuous use of the conveyor system 10. Ingress to, and egress from the transporting segment 14 of the conveyor system 10 may be provided by chutes 27, 29, or other motion diverters, to assure that produce moves onto and off the conveyor system 10 at locations therealong that are removed from the sanitizing procedures in the cleaning segment 15.

In one embodiment of the present invention, the sprayed fluid composition of water and chemicals is cooled to approximately 35° F., and the entire conveyor system 10 and associated produce-handling equipment is housed and operated at approximately 35° F. to assure that produce in contact with the conveyor belt 12 and diverters 27, 29 does not experience thermal transients between different components operating at different temperatures. The belt 12 thus sanitized and rinsed (and, optionally, cooled) on a continuous basis is continuously available in sanitized condition to transport produce within the transporting segment 14 without significant contaminants or residues remaining from previous transports of produce.

Sanitizing the conveyor belt 12 on a continuous basis in accordance with the present invention promotes substantially zero total plate count (tpc) of bacteria and other microbes on the conveyor belt 12 which might otherwise be transferred to fresh produce being transported on the belt 12. Although zero tpc may not be realized (due, for example, to airborne microbes that deposit on the belt 12), readings of undesirable bacteria and microbes such as aerobic coliforms and *E-coli* bacteria may be negligible at less than 10 (rather than at several hundreds of thousands or millions), and the tpc readings of undesirable anaerobic microbes such as listeria and monocytogenes may be negligible at less than 100. Testing to assure such low tpc may be performed on sample scrapings from the belt, or on sample drainage from the belt, or on sample produce following transport on the belt 12. It is believed that such undesirable bacteria and microbes multiply rapidly on fresh produce to accelerate the decay or other forms of deterioration of the fresh produce, with concomitant shortened shelf life after harvest. It is also believed that significantly reducing the residual tpc toward zero according to the present invention extends the time interval over which undesirable microbe build up, with associated extended shelf life of the freshly-harvested produce.

Therefore, the conveyor system of the present invention facilitates sanitized handling of produce along one or other processing routes involved in processing freshly-harvested produce for distribution to retailers.

I claim:

1. A conveyor system for reducing bacteriological agents available to attack fresh produce during transport thereof on the conveyor system which comprises:

a conveyor structure having an underside surface and an opposed upper surface disposed to contact and support fresh produce conveyed thereby within a chilled environment, the surface disposed to contact fresh produce extending over the length of the conveyor system operating at approximately 35° F.;

drive module coupled to move the conveyor structure in substantially continuous motion along a path between the ends of the conveyor system within the chilled environment and recurringly past ingress and egress locations therealong;

at least one cleaning station disposed within the chilled environment between ends of the conveyor system at a location along the conveyor structure past an egress location and prior to an ingress location and including spray nozzles disposed to spray a fluid composition including disinfectant at a selected concentration at a temperature of approximately 35° F. on the upper and underside surfaces of the conveyor structure; and motion diverters at ingress and egress locations disposed within the chilled environment at locations along the path remote from said cleaning station and between ends of the conveyor system to transfer produce relative to the surface of the conveyor structure that contacts the fresh produce.

2. A method for reducing bacteriological agents available to attack fresh produce during transport thereof on a conveyor system between ingress and egress locations, the method, comprising:

preparing a supporting moving surface of the conveyor system for contacting and moving the fresh produce within a chilled environment between the ingress and egress locations spaced apart by a selected distance over which the supporting surface is recurringly moved;

maintaining the supporting moving surface in contact with the fresh produce between the ingress and egress locations within the chilled environment at a temperature of approximately 35° F.;

transferring the fresh produce relative to the moving supporting surface at the ingress and egress locations within the chilled environment; and spraying with a disinfectant fluid composition having selected concentration at a temperature of approximately 35° F. the supporting moving surface and a surface of the conveyor system opposite the supporting moving surface at a location past the egress location and prior to the ingress location.

* * * * *